United States Patent [19]

Leurer

[11] Patent Number: 4,759,226
[45] Date of Patent: Jul. 26, 1988

[54] DEVICE FOR MEASURING THE TENSILE FORCE ON A THREAD

[75] Inventor: Erwin Leurer, Fuchsstadt, Fed. Rep. of Germany

[73] Assignee: FAG Kugelfischer Georg Schafer (KGaA), Fed. Rep. of Germany

[21] Appl. No.: 833,201

[22] Filed: Feb. 25, 1986

[30] Foreign Application Priority Data

Feb. 26, 1985 [DE] Fed. Rep. of Germany ....... 3506698

[51] Int. Cl.⁴ ................................................ G01L 5/10
[52] U.S. Cl. ............................. 73/862.48; 73/DIG. 3
[58] Field of Search ......... 73/862.48, 862.47, DIG. 3; 200/61.18; 242/148; 254/273; 340/668, 677; 338/32 H

[56] References Cited

U.S. PATENT DOCUMENTS

| 1,211,820 | 1/1917 | Burbank | 73/862.47 |
| 2,674,127 | 4/1954 | Garrett et al. | 73/862.48 X |
| 3,280,623 | 10/1966 | Saxl | 73/862.48 X |
| 3,495,454 | 2/1970 | Heimes | 73/862.48 |
| 3,994,162 | 11/1976 | Auckland et al. | 73/862.46 |
| 4,041,779 | 8/1977 | Greb | 73/862.45 |
| 4,098,115 | 7/1978 | Bueb et al. | 73/862.45 |
| 4,393,725 | 7/1983 | Satterfield | 73/862.41 |
| 4,597,297 | 7/1986 | Smith | 73/862.48 |

FOREIGN PATENT DOCUMENTS

| 3138985 | 4/1983 | Fed. Rep. of Germany | 73/861.74 |
| 153797 | 10/1963 | U.S.S.R. | 73/862.48 |

Primary Examiner—Charles A. Ruehl
Attorney, Agent, or Firm—Ostrolenk, Faber, Gerb & Soffen

[57] ABSTRACT

A device for measuring the tensile force on a thread includes a housing having thread guides at the points of inlet and outlet of the thread. A spring plate is mounted on the housing intermediate the thread guides and has a dumbbell-shaped guide member at its end for engaging the thread. The spring plate is so mounted that the tension on the thread displaces the spring plate from its initial unflexed position. Adjacent the guide member on the movable spring plate is a permanent magnet which moves with the spring plate as it displaces. A sensor employing the Hall effect is fixed to the housing at a given distance from the magnet. Movements by the magnet are detected by the Hall sensor, which produces an output signal indicative of the displacement of the spring plate, which signal is processed to give an indication of the thread tension.

11 Claims, 3 Drawing Sheets

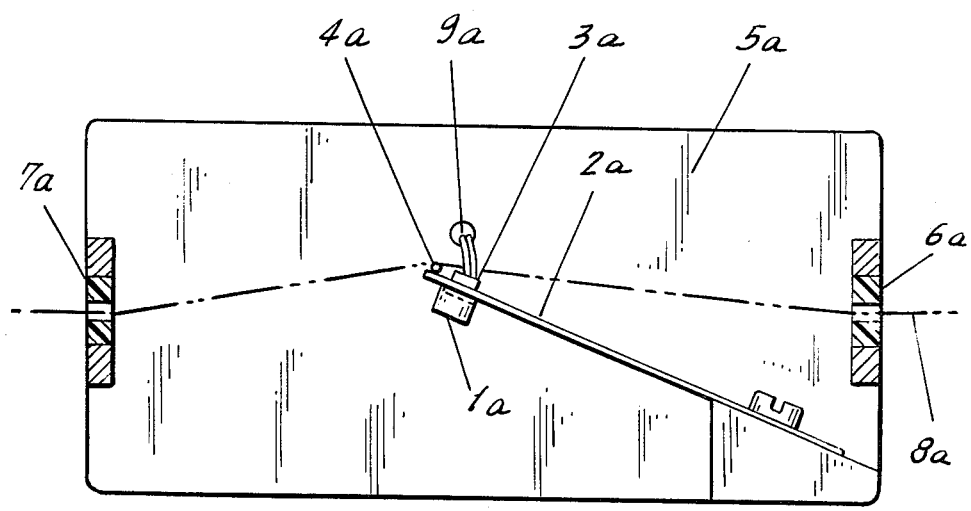

DEVICE FOR MEASURING THE TENSILE FORCE ON A THREAD

BACKGROUND OF THE INVENTION

1. Field of the Invention

The present invention relates to a device for measuring the tensile force on a thread. It relates more particularly to a device in which a magnet on a spring plate is displaced by the thread tension, and the changing magnetic field of the magnet is sensed by a fixed Hall sensor which produces an output signal indicative of the thread tension.

2. Description of Related Art

A number of thread tension measuring devices are known. If they are not of purely mechanical construction, they operate electrically by means of inductive or capacitive displacement transducers, as well as wire strain gauges. In order to obtain a useful indication from such a device, an amplifier is necessary. Thus, for instance, in Federal Republic of German Pat. No. 26 44 358 there are disclosed two thread tension sensors which operate with a pair of electric induction coils and a differential amplifier. In order to obtain an indication which is at all useful with these described devices, expensive and costly amplifiers are necessary. The operation of these devices can be greatly impaired by accumulations of dirt which may form between the induction coils as well as in the differential amplifier. The dirt narrows the displacements to be measured, and thus the device becomes ineffective. Furthermore, the devices require fine adjustments to a tension spring and an adjustment screw which are complicated and imprecise and may lead to erroneous output values.

In a further Federal Republic of Germany patent application, No. AS 24 34 158, a device is described which operates by means of an electromagnet. In this device also, an amplifier must be provided in order to obtain a usable display, which is expensive and is scarcely feasible from an economic standpoint.

Another disadvantage of the latter device lies in the support arrangement of the feeler arm. The device must operate properly at thread tension of about 2 to 3 g. Nevertheless, this device includes a pivot point, on which the feeler arm pivot, that may exhibit a high moment of friction. This arrangement is very trouble-prone, since the slightest amount of dirt or debris—and this is inevitable, for instance, in texturing—impedes the motion of the pivot point and makes the device ineffective.

SUMMARY OF THE INVENTION

A general object of the present invention is to eliminate these disadvantages.

A further object is to provide a device for measuring the thread tension which, while of simple construction, operates reliably and is also economically feasible.

According to an aspect of the invention, a device for measuring the tension on a thread comprises a frame, and resilient means thereon for bearing against the thread and being displaced thereby as a function of such tension. Means, preferably a magnet, are provided for generating an electromagnetic field between the frame and the resilient means which varies as a function of such displacement. Sensor means are also provided which employ the Hall effect to sense such field and to generate an output signal indicative of such tension.

The device may advantageously comprise retaining means for retaining the thread in engagement with the resilient means. The retaining means comprise thread guides on opposite sides of the location at which the resilient means engage the thread. Preferably, the frame and the retaining means define a physical space in which the other elements are contained, so as to achieve a compact, regular configuration.

According to a further aspect, the retaining means may include a pair of low-friction guide rollers, or alternatively a pair of fixed flanges having holes therein for accommodating the thread. The retaining means rollers or flanges are disposed on either side of the location at which the resilient means engages the thread, as noted above.

In another aspect of the invention, the resilient means includes a spring plate mounted on the frame, having a dumbbell-shaped guide member at its end for engaging the thread with a low coefficient of friction.

Advantageously, the displacement of the resilient means is either at a substantially constant distance from the sensor means, or generally toward and away from the sensor means.

A device according to an embodiment of the invention comprises a compact housing which has thread guides at the points of inlet and outlet of the thread. A spring plate is mounted on the housing intermediate the thread guides and has a dumbbell-shaped guide member at its end for engaging the thread with a low coefficient of friction. The spring plate is so mounted that it is displaced from its initial unflexed position by the tension on the thread. Adjacent the guide member on the movable spring plate is fastened a permanent magnet which follows along in every movement of the spring plate resulting from a change in the thread tension. A sensor employing the Hall effect is fixed to the housing at a given distance from the magnet. Every movement of the magnet is detected by the Hall sensor, which produces an output signal indicative of the displacement of the guide member, and hence of the thread tension. Two advantageous arrangements of the magnet and the Hall sensor are provided. In one, the magnet displaces along a line generally toward and away from the Hall sensor. In the other, the magnet displaces along a line whose distance from the sensor is substantially constant.

The sensor output may be input to a computer. The desired thread tension may also be input to the computer. In such an arrangement, if the thread tension is too high or too low, the computer may sound an alarm, or may automatically stop the motion of the thread, for example if the alarm indicates a thread break. Furthermore, it is possible to interrogate, control and monitor sensors at several positions, as described, for instance, in Federal Republic of Germany Pat. No. 30 05 746.

Another advantageous aspect of the invention is that it is less easy for particles of dirt to become deposited between the permanent magnet and the Hall sensor so as to interfere with their spacing.

A further advantageous development is that the thread guides which are arranged at the thread inlet and the outlet of the device may be low-friction guide rollers. The course of the thread is affected very little by such rollers and friction is substantially eliminated.

Another advantage of the invention resides in the direct measurement of displacement by means of the permanent magnet and the Hall probe. The arrangement makes an amplifier unnecessary so the arrangement is optimal from an economic standpoint.

This device has a broad range of uses. It can be installed or retrofitted in texturing-spinning-twisting machines, warping creels, or similar machines without great expense.

BRIEF DESCRIPTION OF THE DRAWINGS

Illustrative embodiments of devices according to the invention will be explained in further detail with reference to the drawings, in which:

FIG. 5 is an elevation, partly in cross-section, of a further embodiment of the invention.

DETAILED DESCRIPTION OF PREFERRED EMBODIMENTS

Figure 1:
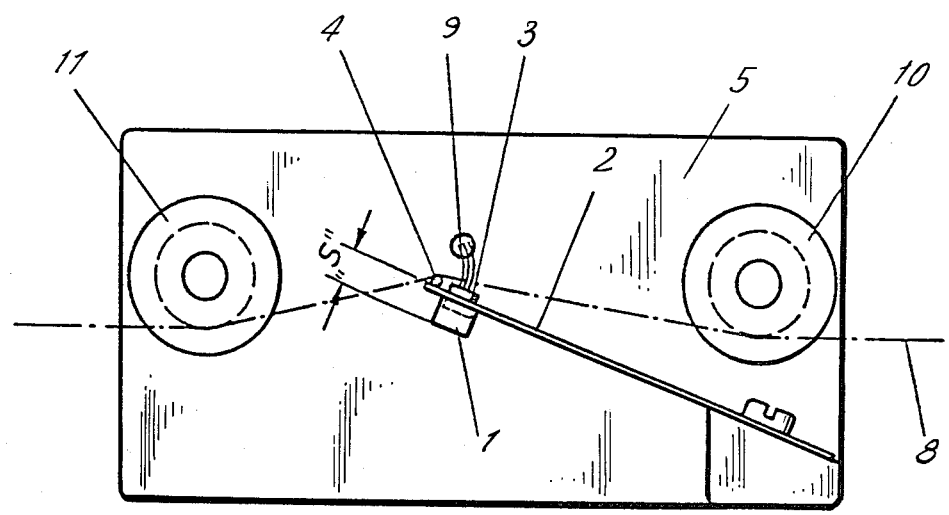
FIG. 1 is an elevation of a first embodiment of the invention, in which the permanent magnet and Hall sensor are arranged so that the magnet displaces at substantially constant distance from the sensor, and having low-friction thread guide rollers.

FIG. 1 is an elevation of a first embodiment of the invention. A frame or housing 5 has two low-friction rollers 10 and 11 mounted thereon for guiding a thread 8. A Hall sensor 3 is mounted on the frame intermediate the rollers. A cable 9 runs from the Hall sensor 3 to a computer (not shown). A spring plate 2 is mounted on the frame 5 for deflection generally parallel to the frame 5. A dumbbell-shaped guide member 4 is attached to a free end of the spring plate 2 for engaging the thread with a low coefficient of friction. The length of the spring plate is such that guide member 4 deflects the thread somewhat from its straight path between the roller 10 and 11, and correspondingly the tension on the thread bends the spring plate by an amount that is indicative of the tension on the thread. Mounted on the spring plate relatively near the guide member 4 is a permanent magnet 1. The permanent magnet 1 moves with the spring plate 2 as it is deflected by the effect of the thread tension. Accordingly, the permanent magnet 1 moves in a plane more-or-less parallel to the surface of the frame on which the Hall sensor 3 is mounted. Thus, dirt and debris cannot easily build up between the magnet and the Hall sensor or interfere with the motion of the spring plate.

In this arrangement, the proximity of the magnet to the Hall sensor, and consequently the magnetic flux detected by the Hall sensor, varies as a function of thread tension. Thus, the tension on the thread can be determined by appropriate processing of the output signal from the Hall sensor 3.

Figure 2:
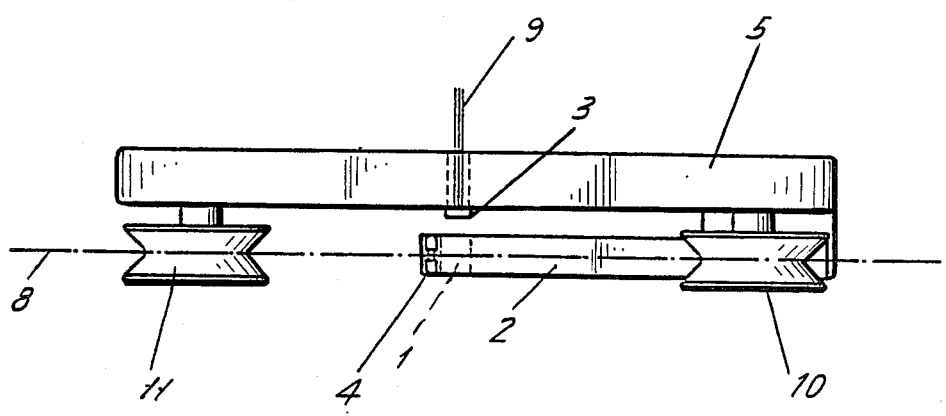
FIG. 2 is a plan view of the device shown in FIG. 1.

In FIG. 1, "s" indicates an example of a displacement of the free end of the spring plate 2 caused by a given amount of thread tension. In FIG. 2, it is seen that the thread 8, the spring plate 2, the guide member 4, and the rollers 10 and 11 are all substantially coplanar, and extend in a plane substantially parallel to the surface of the frame on which the Hall sensor 3 is mounted.

Figure 3:
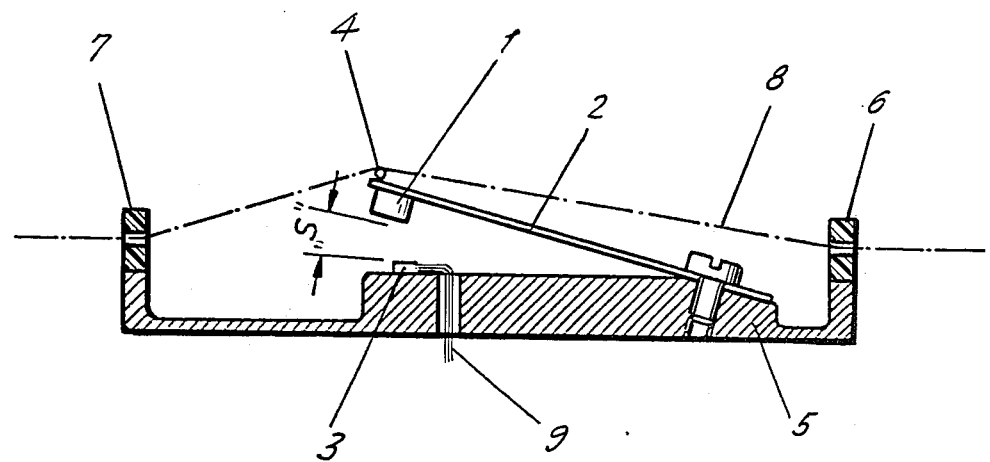
FIG. 3 is a cross-sectional elevation of another embodiment of the invention, in which the magnet displaces generally toward and away from the sensor, and having fixed thread guides.

Another embodiment of the invention is shown in FIG. 3. In this embodiment, the spring plate 2, guide member 4, and permanent magnet 1 are mounted to the frame or housing 5, so that the motion of the free end of the spring plate under the effect of the tension on the thread, indicated by and over the range set by the measurement "s", is generally toward and away from the Hall sensor 3. This embodiment also includes thread guides 6 and 7, which comprise flanges or the like on the housing 5 with holes for accommodating the thread, and the holes are preferably formed by or lined with plastic grommets, or the like.

Figure 4:
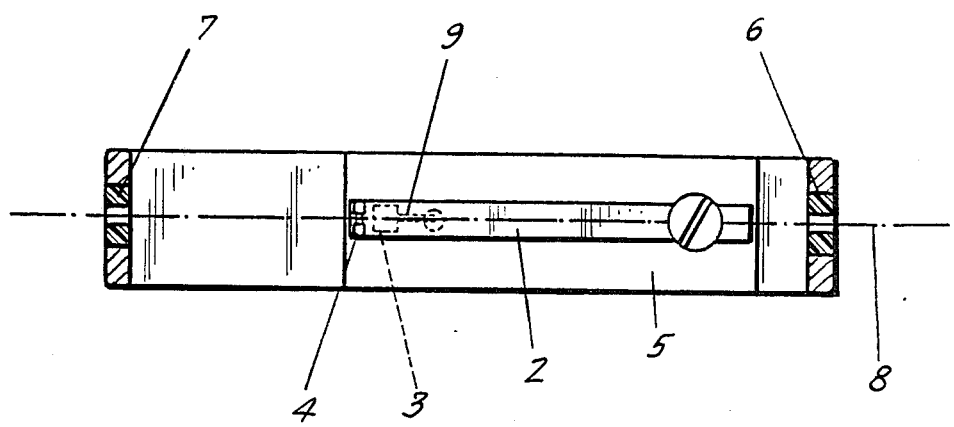
FIG. 4 is a plan view of the device shown in FIG. 3.

The operation and results of the embodiment of FIGS. 3 and 4 are substantially the same as those of the previous embodiment.

As seen in the Figures, particularly FIGS. 2-4, the device is substantially self-enclosed on its ends by the rollers 10 and 11 or the thread guides 6 and 7, achieving a highly compact and regular unit.

A further embodiment of the invention is shown in FIG. 5. As seen therein, a device for measuring the tensile force on a thread may comprise a spring plate 2a and its associated components, as in the embodiment of FIGS. 1 and 2; and thread guides 6a and 7a, as in the embodiment shown in FIGS. 3 and 4. The operation of the various elements and parts of the embodiment of FIG. 5 will be understood from the above description of FIGS. 1-4.

Although illustrative embodiments of the invention have been described herein, the invention is not limited to such embodiments, but rather modifications and variations may occur to those skilled in the art within the scope of the invention, as defined only in the following claims.

What is claimed is:

1. A device for measuring the tension on a thread, comprising:
   (a) a frame;
   (b) resilient means on the frame for bearing against the thread at a bearing point and being displaced thereby as a function of such tension;
   (c) generating means on the resilient means and adjacent the bearing point for generating an electromagnetic field between the frame and the resilient means which varies as a function of such displacement;
   (d) sensor means on the frame for sensing such field and generating an output signal indicative of such tension; and
   (e) further comprising retaining means on the frame for retaining the thread in engagement with the resilient means, the retaining means including a pair of fixed flanges on the frame on both sides of the bearing point at which the resilient means engages the thread, the flanges having holes therein for accommodating the thread.

2. A device as in claim 1, in which the resilient means includes a spring plate mounted on the frame and deflectable along its length.

3. A device as in claim 2, in which the spring plate has a dumbbell-shaped guide member at an end thereof for engaging the thread with a low coefficient of friction.

4. A device as in claim 3, in which the dumbbell-shaped guide member has enlarged portions at ends thereof, which form therebetween a central notch-like portion for engaging the thread.

5. A device as in claim 4, in which the central notch-like portion of the guide member includes a central portion extending between said enlarged portions and having substantially uniform thickness, for permitting said thread to be engaged by said guide member at any points along said central portion.

6. A device as in claim 1, in which the generating means includes a magnet mounted on the resilient means for displacement therewith.

7. A device as in claim 6, in which the resilient means includes a spring plate mounted at one end on the frame and deflectable along its length, and the magnet is mounted on an end of the spring plate away from the frame.

8. A device as in claim 7, in which the displacement of the magnet is in a plane extending generally toward any away from the sensor means.

9. A device as in a claim 7, in which the displacement of the magnet as in a plane at a distance spaced away from the sensor means.

10. A device for measuring the tension on a thread, comprising:
 (a) a frame;
 (b) resilient means including a spring plate mounted on the frame and deflectable along its length for directly slidingly engaging the thread at a bearing point and being displaced thereby as a function of such tension;
 (c) generating means on the resilient means and adjacent the bearing point for generating an electromagnetic field between the frame and the resilient means which varies as a function of such displacement; and
 (d) sensor means on the frame for sensing such field and generating an output signal indicative of such tension;
 in which the spring plate has a dumbbell-shaped guide member at an end thereof, the dumbbell-shaped guide member having enlarged portions at ends thereof, which form therebetween a central notch-like portion, for engaging the thread with a low coefficient of friction; and
 in which the central notch-like portion of the guide member includes a central portion extending between said enlarged portions and having substantially uniform thickness, for permitting said thread to be engaged by said guide member at any point along said central portion.

11. A device for measuring the tension on a thread, comprising:
 (a) a frame;
 (b) resilient means having two ends, the resilient means being mounted at one end thereof on the frame and being deflectable along the length of the resilient means; the resilient means having a dumbbell-shaped guide member at the other end thereof for bearing against the thread at a bearing point with a low coefficient of friction and being displaced thereby as a function of such tension; the dumbbell-shaped guide member having enlarged portions at ends thereof, which form therebetween a central notch-like portion for engaging the thread;
 (c) generating means for generating an electromagnetic field between the frame and the resilient means which varies as a function of such displacement; and
 (d) sensor means for sensing such field and generating an output signal indicative of such tension;
 in which the central notchlike portion of the guide member includes a central portion extending between said enlarged portions and having substantially uniform thickness, for permitting said thread to be engaged by said guide member at any point along said central portion.

* * * * *